United States Patent
Shao et al.

(10) Patent No.: US 11,326,101 B2
(45) Date of Patent: May 10, 2022

(54) LIQUID CRYSTAL PANEL AND MANUFACTURE METHOD THEREOF, LIQUID CRYSTAL DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Xibin Shao, Beijing (CN); Feifei Wang, Beijing (CN); Hongming Zhan, Beijing (CN); Ping Song, Beijing (CN); Deqiang Liu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 958 days.

(21) Appl. No.: 16/063,898

(22) PCT Filed: Nov. 17, 2017

(86) PCT No.: PCT/CN2017/111528
§ 371 (c)(1),
(2) Date: Jun. 19, 2018

(87) PCT Pub. No.: WO2018/218884
PCT Pub. Date: Dec. 6, 2018

(65) Prior Publication Data
US 2021/0200010 A1     Jul. 1, 2021

(30) Foreign Application Priority Data

May 31, 2017   (CN) .......................... 201710397869.8

(51) Int. Cl.
*C09K 19/00*     (2006.01)
*G02F 1/1339*    (2006.01)
(Continued)

(52) U.S. Cl.
CPC .......... *C09K 19/00* (2013.01); *G02F 1/13394* (2013.01); *C09K 19/04* (2013.01);
(Continued)

(58) Field of Classification Search
CPC   C09K 19/00; C09K 19/04; C09K 2019/0444; C09K 2019/0448;
(Continued)

(56) References Cited

U.S. PATENT DOCUMENTS

| 5,739,882 A | * | 4/1998 | Shimizu | .............. G02F 1/13394 |
| | | | | 349/123 |
| 5,852,487 A | | 12/1998 | Fujimori et al. | |

(Continued)

FOREIGN PATENT DOCUMENTS

| CN | 1952748   | 4/2007 |
| CN | 102629012 | 8/2012 |

(Continued)

OTHER PUBLICATIONS

Chinese Office Action dated Mar. 2, 2020 corresponding to Chinese Patent Application No. 201710397869.8; 17 pages.
Extended European Search Report dated Jan. 20, 2021 corresponding to European Patent Application No. 17898347.4; 8 pages.

*Primary Examiner* — Ruiyun Zhang
(74) *Attorney, Agent, or Firm* — Leason Ellis LLP

(57) ABSTRACT

A liquid crystal panel and a manufacture method thereof, a liquid crystal display device are disclosed. The manufacture method of a liquid crystal panel includes: providing a first substrate, a second substrate and a liquid crystal layer between the first substrate and the second substrate, wherein the liquid crystal layer includes a liquid crystal material and photopolymerizable monomers; and exposing the liquid crystal layer to allow the photopolymerizable monomers to be polymerized at a position of exposing to form a columnar spacer.

16 Claims, 5 Drawing Sheets

(51) Int. Cl.
    *C09K 19/04*     (2006.01)
    *G02F 1/1335*    (2006.01)
    *G02F 1/1337*    (2006.01)

(52) U.S. Cl.
    CPC .. *C09K 2019/0444* (2013.01); *C09K 2323/05* (2020.08); *G02F 1/1337* (2013.01); *G02F 1/13396* (2021.01); *G02F 1/13398* (2021.01); *G02F 1/133512* (2013.01)

(58) Field of Classification Search
    CPC .......... C09K 2323/05; C09K 2323/057; C09K 2323/00; G02F 1/13394; G02F 1/13396; G02F 1/13398; G02F 1/133512; G02F 1/1337
    USPC .................. 428/1.5, 1.54, 1.1; 349/156, 158, 349/156.158
    See application file for complete search history.

(56) References Cited

U.S. PATENT DOCUMENTS

| | | | |
|---|---|---|---|
| 9,971,204 B2 | 5/2018 | Li et al. | |
| 2016/0355733 A1* | 12/2016 | Wang | ................. C09K 19/3852 |
| 2018/0171235 A1 | 6/2018 | Chen | |

FOREIGN PATENT DOCUMENTS

| | | | |
|---|---|---|---|
| CN | 103336390 | | 10/2013 |
| CN | 106281365 | | 1/2016 |
| CN | 105676540 | | 6/2016 |
| CN | 105785667 | | 7/2016 |
| CN | 105954920 | | 9/2016 |
| JP | 2010049238 | | 3/2010 |
| JP | 2012103474 | | 5/2012 |
| KR | 1020110111138 | | 10/2011 |
| KR | 2011011138 | * | 4/2012 |

* cited by examiner

LIQUID CRYSTAL PANEL AND MANUFACTURE METHOD THEREOF, LIQUID CRYSTAL DISPLAY DEVICE

CROSS-REFERENCE TO RELATED PATENT APPLICATIONS

This application is a U.S. National Stage Application under 35 U.S.C. § 371 of International Patent Application No. PCT/CN2017/111528 filed Nov. 17, 2017, which claims the benefit of priority under 35 U.S.C. Section 119(e) of Chinese Patent Application number 201710397869.8 filed May 31, 2017, both of which are incorporated by reference in their entireties.

TECHNICAL FIELD

The present disclosure relates to a liquid crystal panel and a manufacture method thereof, a liquid crystal display device.

BACKGROUND

A liquid crystal panel comprises a first substrate and a second substrate that are provided in parallel, the two substrates are assembled with each other by a sealant to form a liquid crystal cell, and a liquid crystal material is contained in the liquid crystal cell and between the two substrates. A photo spacer (PS) is a structure in the liquid crystal cell for maintaining the uniformity of the cell thickness, and for example comprises a columnar spacer (post spacer). Generally, one end of the photo spacer is formed on one substrate and the other end abuts against the other substrate.

In a conventional manufacture process of the liquid crystal panel, manufacture of the columnar spacer is usually performed after the process of forming an overcoat is completed, and then the process of forming an alignment film (for example, PI) is performed. In the process of manufacturing the columnar spacer, a multi-step process such as photoresist coating, exposing, developing, and shaping is generally required, and the whole process is relatively complicated. In addition, when forming the liquid crystal cell, for example, the assembling of the color filter substrate on which the color filter is formed and the array substrate on which the thin film transistor is formed is also performed after the manufacture of the columnar spacer is completed.

SUMMARY

At least one embodiment of the present disclosure provides a manufacture method of a liquid crystal panel, the method comprises: providing a first substrate, a second substrate and a liquid crystal layer between the first substrate and the second substrate, and the liquid crystal layer comprises a liquid crystal material and photopolymerizable monomers; and exposing the liquid crystal layer to allow the photopolymerizable monomers to be polymerized at a position of exposing to form a columnar spacer.

In the manufacture method of a liquid crystal panel provided by at least one embodiment of the present disclosure, exposing of the liquid crystal layer to form the columnar spacer is performed after the first substrate and the second substrate are assembled.

The manufacture method of a liquid crystal panel provided by at least one embodiment of the present disclosure further comprises: forming a black matrix at a position, on a surface of the first substrate that is away from the second substrate, corresponding to the position of the columnar spacer after the exposing to form the columnar spacer.

In the manufacture method of a liquid crystal panel provided by at least one embodiment of the present disclosure, the first substrate comprises a plurality of sub-pixel units, and an orthogonal projection of the position at which the column spacer to be formed on the first substrate and an orthogonal projection of an interval between adjacent sub-pixel units on the first substrate are overlapped.

In the manufacture method of a liquid crystal panel provided by at least one embodiment of the present disclosure, the exposing is performed by using a mask to irradiate light to the liquid crystal materials, and the columnar spacer is formed at the position corresponding to an opening of the mask.

In the manufacture method of a liquid crystal panel provided by at least one embodiment of the present disclosure, exposing of different exposure degrees is conducted at different positions of the mask so as to form a main spacer and an auxiliary spacer with different heights.

In the manufacture method of a liquid crystal panel provided by at least one embodiment of the present disclosure, a plurality of masks are used for forming the main spacer and auxiliary spacer, respectively; or a mask comprising at least a first opening and a second opening is used, wherein the first opening is larger than the second opening, or light transmittance of the first opening and light transmittance of the second opening are different, so as to form the main spacer and the auxiliary spacer, respectively.

In the manufacture method of a liquid crystal panel provided by at least one embodiment of the present disclosure, the photopolymerizable monomers comprise one or more of the followings:

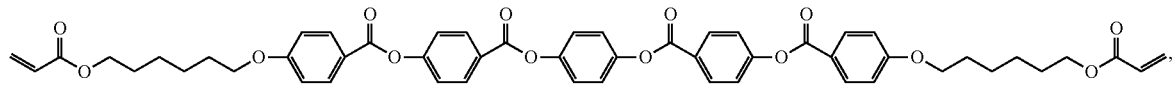

-continued

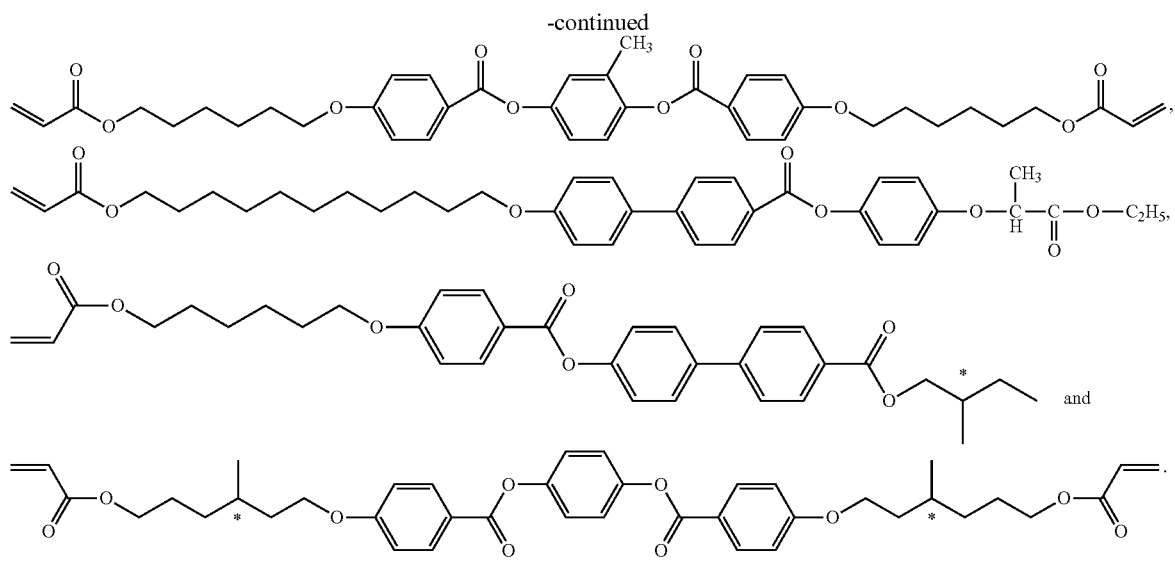

In the manufacture method of a liquid crystal panel provided by at least one embodiment of the present disclosure, irradiation is performed by ultraviolet light to achieve the exposing.

In the manufacture method of a liquid crystal panel provided by at least one embodiment of the present disclosure, the liquid crystal layer further comprises an ultraviolet photoinitiator.

In the manufacture method of a liquid crystal panel provided by at least one embodiment of the present disclosure, the ultraviolet photoinitiator comprises

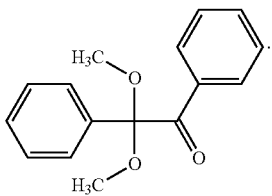

In the manufacture method of a liquid crystal panel provided by at least one embodiment of the present disclosure, the liquid crystal layer further comprises an ultraviolet absorber.

In the manufacture method of a liquid crystal panel provided by at least one embodiment of the present disclosure, the ultraviolet absorber comprises The manufacture method of a liquid crystal panel provided by at least one embodiment of the present disclosure further comprises: coating a sealant on an edge of the first substrate or the second substrate; assembling the first substrate and the second substrate to form a liquid crystal cell, and injecting the liquid crystal layer in the liquid crystal cell; and curing the sealant.

In the manufacture method of a liquid crystal panel provided by at least one embodiment of the present disclosure, curing the sealant and forming the columnar spacer are performed in a same exposing process.

The manufacture method of a liquid crystal panel provided by at least one embodiment of the present disclosure further comprises: forming an alignment layer on the first substrate and/or the second substrate before assembling to form the liquid crystal cell.

At least one embodiment of the present disclosure provides a liquid crystal panel, comprising: a first substrate and a second substrate that are assembled with each other; and a liquid crystal layer between the first substrate and the second substrate, wherein a columnar spacer formed of a polymer formed by polymerizing photopolymerizable monomers is in the liquid crystal layer.

In the liquid crystal panel provided by at least one embodiment of the present disclosure, the columnar spacer comprises a main spacer and an auxiliary spacer with different heights.

In the liquid crystal panel provided by at least one embodiment of the present disclosure, a black matrix is on

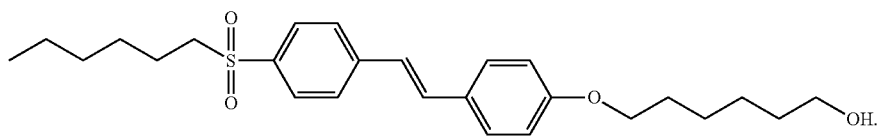

a surface of the first substrate that is away from the second substrate, and the column spacer is at a position corresponding to the black matrix.

At least one embodiment of the present disclosure provides a liquid crystal display device, comprising any one of the above liquid crystal panels.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
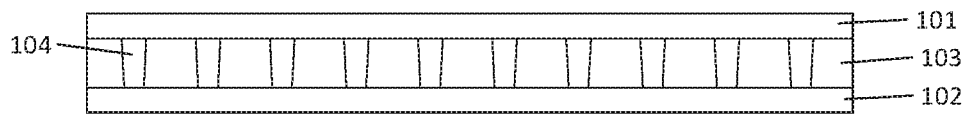
FIG. 1 is a schematic diagram of a liquid crystal panel in an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

As above described, in the conventional manufacture process of liquid crystal panel, manufacture of the columnar spacer is usually performed after the process of forming an overcoat is completed, and then the process of forming an alignment film is performed. In the process of manufacturing the columnar spacer, a multi-step process such as photoresist coating, exposing, developing, and shaping is generally required, and the whole process is relatively complicated.

At least one embodiment of the present disclosure provides a manufacture method of a liquid crystal panel, the method comprises: providing a first substrate, a second substrate and a liquid crystal layer between the first substrate and the second substrate. The liquid crystal layer comprises a liquid crystal material and photopolymerizable monomers; and exposing the liquid crystal layer to allow the photopolymerizable monomers to be polymerized at a position of exposing to form a columnar spacer.

At least one embodiment of the present disclosure provides a liquid crystal panel, comprising: a first substrate and a second substrate that are assembled with each other; and a liquid crystal layer between the first substrate and the second substrate. A columnar spacer formed of a polymer formed by polymerizing photopolymerizable monomers is in the liquid crystal layer.

Hereinafter, the concept of the present disclosure is illustrated through several specific embodiments.

Embodiment 1

An embodiment of the present disclosure provides a liquid crystal panel. As illustrated in FIG. 1, the liquid crystal panel comprises: a first substrate 101 and a second substrate 102 that are assembled with each other to form a cell; and a liquid crystal layer 103 between the first substrate 101 and the second substrate 102. A columnar spacer 104 is formed of a polymer formed by polymerizing photopolymerizable monomers is in the liquid crystal layer 103. Molecules of the photopolymerizable monomers are mixed into an original liquid crystal material, and can be activated, for example, by light illumination to generate free radicals to be polymerized. In the embodiment, there are a plurality of columnar spacers 104, and a size of each columnar spacer 104 is substantially the same.

In the embodiment, according to a structure of the liquid crystal panel, the first substrate 101 and the second substrate 102 can be in various forms. For example, in an example, the liquid crystal panel is used for a liquid crystal display, and therefore the first substrate 101 and the second substrate 102 can be an opposite substrate and an array substrate, respectively. The opposite substrate can be, for example, a color filter substrate; alternatively, where the array substrate is a COA (Color on Array) array substrate, there is no need to form a color filter or the like on the opposite substrate, but a black matrix can be formed on the opposite substrate. For example, in another example, the liquid crystal panel is used to form a liquid crystal grating, and therefore the first substrate 101 and the second substrate 102 can be same or different from each other. For example, one of the first substrate 101 and the second substrate 102 is formed to comprise a first electrode layer comprising a plurality of parallel stripe electrodes, the other one is formed to comprise a plate electrode. The specific types of the first substrate 101 and the second substrate 102 are not limited in the embodiments of the present disclosure. Hereinafter, the case that the first substrate 101 and the second substrate 102 being respectively a color filter substrate and an array substrate is taken as an example to illustrate. The array substrate comprises, for example, structures such as a gate line, a data line, a sub-pixel and so on, which will not be described in detail here; the color filter substrate comprises, for example, structures such as a color filter and so on, which will not be described in detail here as well.

Figure 2:
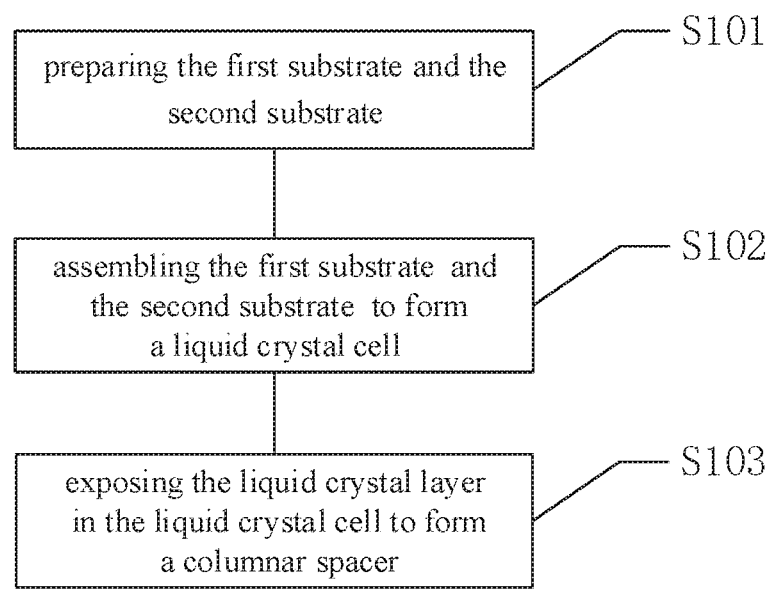
FIG. 2 is a flow diagram of a manufacture method of a liquid crystal panel in an embodiment of the present disclosure.

The embodiment further provides a manufacture method of a liquid crystal panel as illustrated in FIG. 1. The method comprises: providing a first substrate 101, a second substrate 102, and a liquid crystal layer 103 between the first substrate 101 and the second substrate 102, the liquid crystal layer 103 comprising a liquid crystal material and photopolymerizable monomers; exposing the liquid crystal layer 103 to allow the photopolymerizable monomers to be polymerized at a position of exposing to form a columnar spacer 104. As illustrated in the flow diagram of FIG. 2, the manufacture method can comprise the following steps:

S101: Preparing the First Substrate 101 and the Second Substrate 102.

Figure 3:
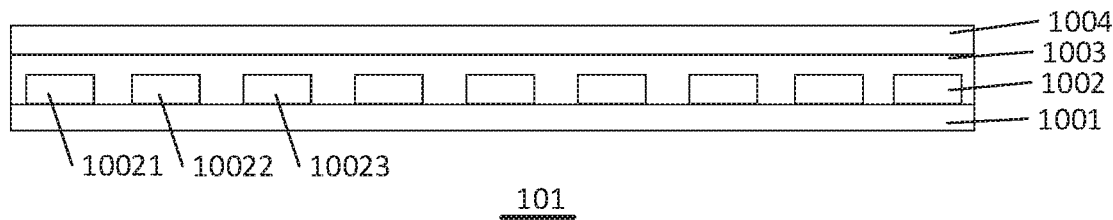
FIG. 3 is a schematic diagram of a first substrate of a liquid crystal panel in an embodiment of the present disclosure.

In the embodiment, the first substrate 101 can be a color filter substrate with a color filter. As illustrated in FIG. 3, the first substrate 101 comprises a plurality of pixel units, and each pixel unit comprises a plurality of sub-pixel units. For example, a color filter layer 1002 is first formed on a base substrate 1001 of the first substrate 101, and a color filter is provided at a position corresponding to each sub-pixel unit in the color filter layer 1002. The base substrate 1001 can be a glass substrate, a plastic substrate or the like. For example, each pixel unit in the embodiment can comprise three types of sub-pixel units 10021, 10022 and 10023 and color filters of red, green and blue can be arranged respectively in the three sub-pixel units, and therefore a red sub-pixel unit 10021 emitting red light, a green sub-pixel unit 10022 emitting green light and a blue sub-pixel unit 10023 emitting blue light are formed. For example, there are a plurality of sub-pixel units of each type (three sub-pixel units of each type are illustrated in the figure). Therefore, different sub-pixel units can emit light of different colors through the above color filters. For example, an overcoat 1003 is formed on the color filter layer 1002 to protect the color filter layer 1002 and planarize a surface of the substrate. The overcoat 1003 can be an inorganic insulation layer or an organic insulation layer. For example, an alignment film 1004 is formed on the overcoat 1003 to form ordered grooves on a surface of the first substrate 101 for allowing liquid crystal molecules in contact with the alignment film 1004 to be arranged orderly in a predetermined direction in an initial state. The alignment film 1004 can be formed of, for example, polyimide (PI). The polyimide is coated and cured on the overcoat 1003, and then the polyimide film is rubbed by a friction roller contacting the surface of the cured polyimide film in a certain direction, and therefore the liquid crystal molecules in contact with the polyimide film can be aligned in the rubbing direction.

It should be noted that the preparation method of the color filter substrate with the color filter described above is only an exemplary implementation, the specific preparation method can be adjusted according to production requirements, and the specific structure and the specific preparation process of the color filter substrate with the color filter are not limited here.

In the embodiment, the second substrate 102 can be an array substrate with a thin film transistor (TFT) as a switching element, and the thin film transistor can be in a conventional form for controlling a switch-on state and a switch-off state of a driving signal. The specific structure of the thin film transistor is not limited here. For example, an alignment film or the like can also be formed on an inner surface of the second substrate 102, and a polarizer or the like can be attached to an outer surface of the second substrate 102.

It should be noted that the above embodiments only exemplarily illustrate the types of the first substrate 101 and the second substrate 102. In other embodiments, the first substrate 101 and the second substrate 102 can also be any other kinds of substrates that can be assembled to provide a cell and accommodate liquid crystals, and the specific types of the first substrate 101 and the second substrate 102 are not limited here.

S102: Assembling the First Substrate 101 and the Second Substrate 102 to Form a Liquid Crystal Cell.

For example, a sealant is coated along an edge of a surface of the first substrate 101 or the second substrate 102, and a composition comprising the liquid crystal material and the photopolymerizable monomers is dripped in an area surrounded by the sealant on the substrate coated with the sealant (a drip method), and then the first substrate 101 and the second substrate 102 are arranged opposite to each other and then assembled with each other by the sealant to form a liquid crystal cell, and the sealant is cured, for example, by ultraviolet irradiation, heating or the like to form a liquid crystal cell (that is an assembling process).

In an example of the present embodiment, the sealant can be coated on the second substrate 102 and the liquid crystal material mixed with the photopolymerizable monomers can be dripped to form the liquid crystal layer 103. For example, the photopolymerizable monomers can be visible light polymerizable monomers, ultraviolet light polymerizable monomers or the like. Accordingly, the light used in the subsequent exposing procedure can be visible light, ultraviolet light or the like, and the types of photopolymerizable monomers are not limited here. For example, the photopolymerizable monomers can comprise one or more of the followings:

For example, where the exposing is performed by irradiation of ultraviolet light, an ultraviolet photoinitiator can be further added in the liquid crystal layer 103. The ultraviolet photoinitiator can absorb energy in a certain wavelength of an ultraviolet light range to generate radicals, cations and so on, so that photopolymerizable monomers can be polymerized. For example, the following material can be added to increase a polymerizing reaction rate of the photopolymerizable monomers:

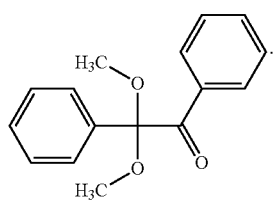 [SMILES: COC(OC)(C(=O)c1ccccc1)c1ccccc1]

For example, an ultraviolet absorber can further be added to the liquid crystal layer 103. The ultraviolet absorber is a kind of material capable of absorbing the ultraviolet part of the light without changing itself. For example, the following material can be added to improve utilization of ultraviolet light and further to promote the polymerizing reaction:

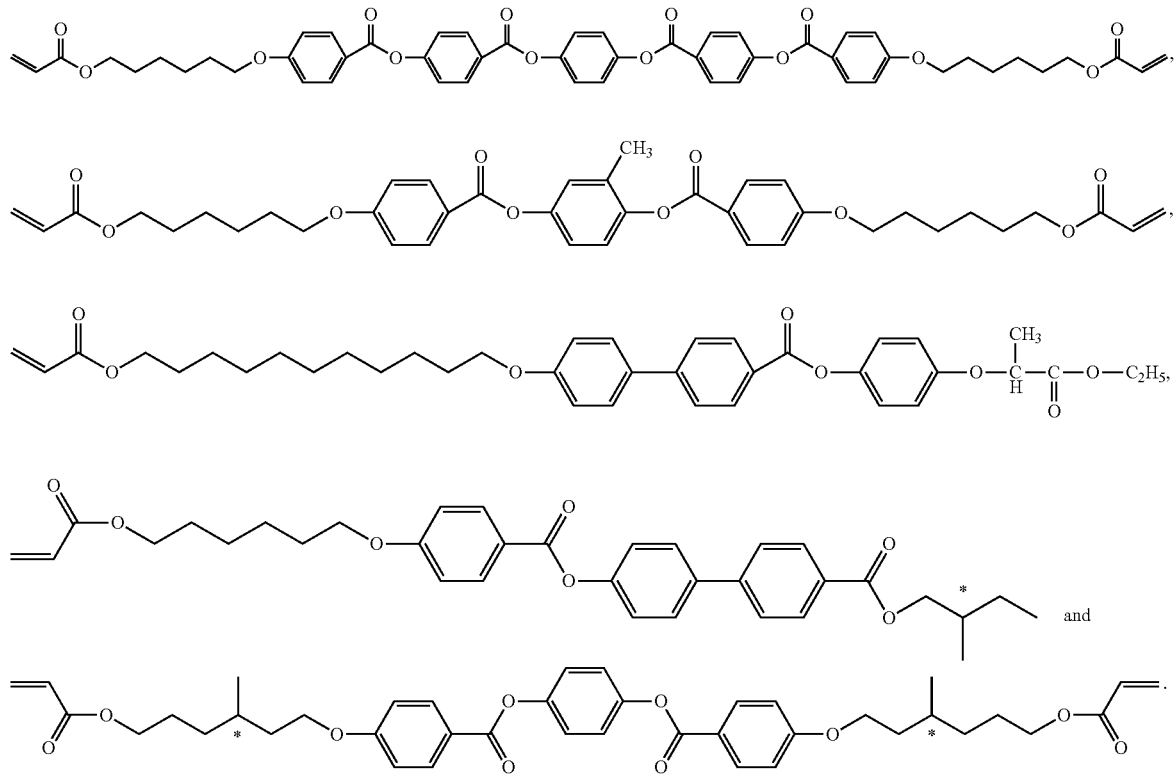

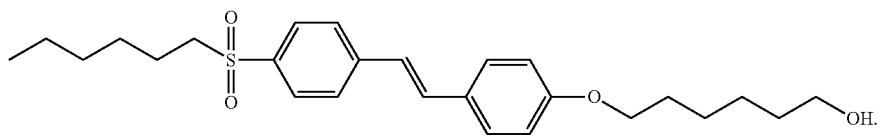 [SMILES: CCCCCCS(=O)(=O)c1ccc(/C=C/c2ccc(OCCCCCCO)cc2)cc1]

Therefore, where the exposing is performed by irradiation of ultraviolet light, for example, a composition comprising the photopolymerizable monomers, the ultraviolet photoinitiator and the ultraviolet absorber can be added in the liquid crystal layer 103 at one time. In the composition, for example, the weight ratios of the photopolymerizable monomers, the ultraviolet photoinitiator and the ultraviolet absorber can be about (94%-99.85%):(0.05%-1%):(0.1%-5%). For example, in the present embodiment, a composition comprising the photopolymerizable monomers, the ultraviolet photoinitiator and the ultraviolet absorber with the weight ratios of about 95%:1%:4% can be added in the liquid crystal layer 103 at one time so that the subsequent exposing process can be performed more efficiently.

It should be noted that the ultraviolet photoinitiator and the ultraviolet absorber can be optionally added. For example, where the reaction rate of the ultraviolet light polymerizable monomers added in the embodiment can meet the production requirements, the ultraviolet photoinitiator and the ultraviolet absorber may not be added. Alternatively, one or more of the ultraviolet photoinitiator and the ultraviolet absorber may be optionally added, and adding amounts of the ultraviolet photoinitiator and the ultraviolet absorber can be appropriately selected according to specific production requirements.

It should be noted that the liquid crystal material and the composition comprising the photopolymerizable monomers in the liquid crystal layer 103 can also be injected between the first substrate 101 and the second substrate 102 after the first substrate 101 and the second substrate 102 are assembled together. For example, in other embodiments of the present disclosure, the materials of the liquid crystal layer 103 can be injected between the first substrate 101 and the second substrate 102 by a method of vacuum injection or the like, and the specific forming method of the liquid crystal layer 103 is not limited here.

S103: Exposing the Liquid Crystal Layer in the Liquid Crystal Cell to Form a Columnar Spacer.

Figure 4:
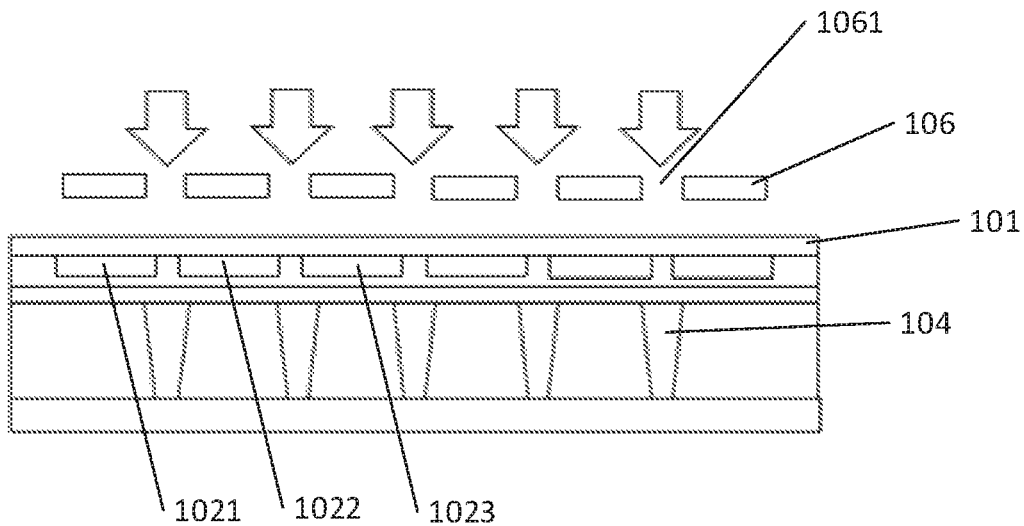
FIG. 4 is a flow diagram of a manufacture method of a liquid crystal panel in another embodiment of the present disclosure.

As illustrated in FIG. 4, an exposing process is performed on the liquid crystal layer 103 in the liquid crystal cell by means of a mask 106. Light irradiates into a partial height or an entire height of the inner portion of the liquid crystal cell at a position of exposing, so the photopolymerizable monomers in the liquid crystal layer 103 can be polymerized at the position of exposing, that is the position corresponding to an opening 1061 of the mask 106, to form a columnar spacer 104.

In the embodiment, for example, the formation position and size of the columnar spacer 104 can be controlled by controlling the position and size of the opening 1061 of the mask 106 or light intensity during the exposing. In the embodiment, for example, the position of the opening 1061 of the mask 106 can be at a position of an interval between adjacent sub-pixel units 10021, 10022 and 10023, and thus the columnar spacer 104 is formed corresponding to the interval between the adjacent sub-pixel units 10021, 10022 and 10023. For example, an orthogonal projection of the formed columnar spacer 104 on the first substrate 101 and an orthogonal projection of the interval between the adjacent sub-pixel units 10021, 10022 and 10023 on the first substrate 101 are overlapped. In the embodiment, because the sizes of the columnar spacers 104 are substantially the same as each other, the openings 1061 of the mask 106 used in the present embodiment are equally-spaced, and sizes of the openings 1061 are the same as each other. Therefore, the columnar spacers 104 formed by exposing the liquid crystal layer 103 in the liquid crystal cell by the mask 106 are at equal intervals, and the sizes of the columnar spacers 104 are substantially the same. Finally, the liquid crystal panel illustrated in FIG. 1 is obtained.

Figure 5:
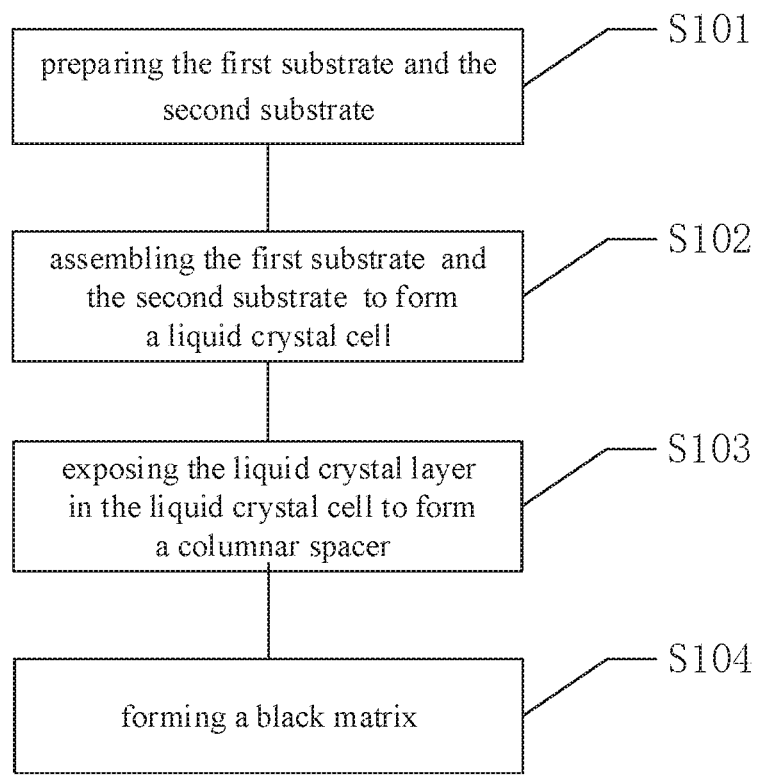
FIG. 5 is a schematic diagram of a columnar spacer formed by exposing through a mask in an embodiment of the present disclosure.

In another example of the present embodiment, as illustrated in the flow diagram of FIG. 5, the manufacture method of a liquid crystal panel can further comprise the following operation:

S104: Forming a Black Matrix.

Figure 6:
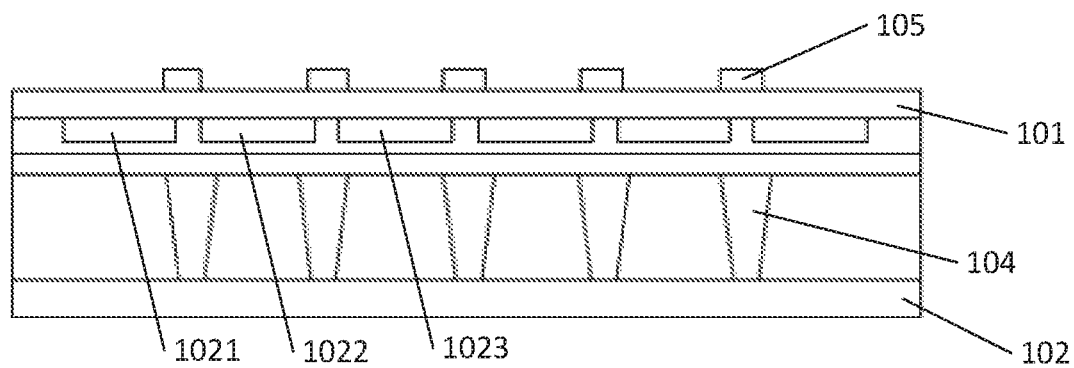
FIG. 6 is a schematic diagram of a liquid crystal panel in an embodiment of the present disclosure.

For example, after exposing to form the columnar spacer, a black matrix 105 is formed at a position, on a surface of the first substrate 101 that is away from the second substrate 102, corresponding to the columnar spacer 104, and therefore the black matrix 105 is also formed corresponding to the position of the interval of the adjacent sub-pixel units 10021, 10022 and 10023. For example, an orthogonal projection of the black matrix 105 on the first substrate 101 and the orthogonal projection of the interval between the adjacent sub-pixel units 10021, 10022 and 10023 on the first substrate 101 are overlapped, and therefore crosstalk between different sub-pixels are prevented, as illustrated in FIG. 6. In the embodiment, the black matrix 105 can be formed of a material such as metallic chromium, chromium oxide or the like, or a material such as an acrylic resin doped with a black pigment (for example, carbon). The specific formation of the black matrix 105 is not limited here.

For example, after the black matrix is formed on the outer surface of the first substrate 101, an overcoat or a planarization layer (not illustrated) can be further formed on the outer surface, and then other components such as a polarizer and so on (not illustrated) can also be attached.

Embodiment 2

Figure 7:
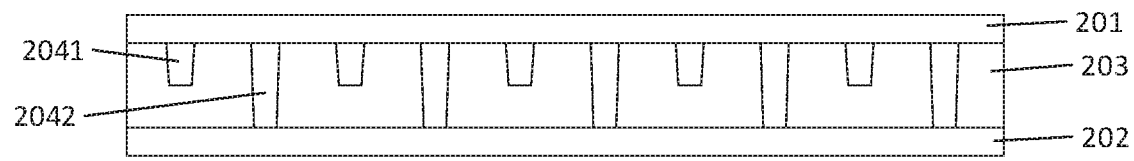
FIG. 7 is a schematic diagram of a liquid crystal panel in another embodiment of the present disclosure.

Another embodiment of the present disclosure provides a liquid crystal panel. As illustrated in FIG. 7, the liquid crystal panel comprises: a first substrate 201 and a second substrate 202 that are assembled with each other; and a liquid crystal layer 203 between the first substrate 201 and the second substrate 202. A main spacer 2042 and an auxiliary spacer 2041 made of a polymer formed by polymerizing photopolymerizable monomers are in the liquid crystal layer 203. In the embodiment, the columnar spacers formed by polymerizing the photopolymerizable monomers have two different sizes, and therefore the higher main spacers 2042 can play a role of supporting the liquid crystal substrate where the liquid crystal substrate is in a normal state, and the lower auxiliary spacer 2041 can play a role of supporting the liquid crystal substrate where the liquid crystal substrate is acted by an external force.

Similarly, the application field of the liquid crystal panel and the specific types of the first substrate 101 and the second substrate 102 are not limited in the embodiment.

Figure 8:
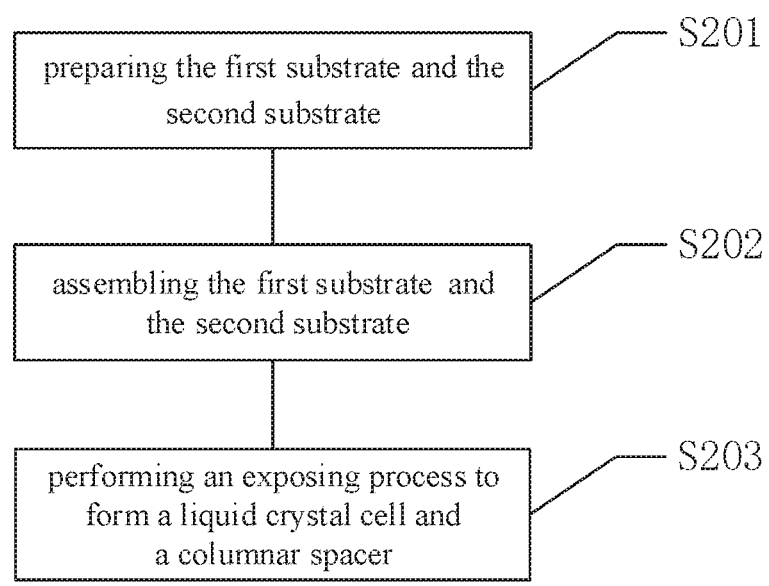
FIG. 8 is a flow diagram of a manufacture method of a liquid crystal panel in another embodiment of the present disclosure.

The embodiment further provides a manufacture method of the liquid crystal panel as illustrated in FIG. 7. As illustrated in FIG. 8, the method comprises the following operations:

S201: Preparing the First Substrate 201 and the Second Substrate 202.

Figure 9:
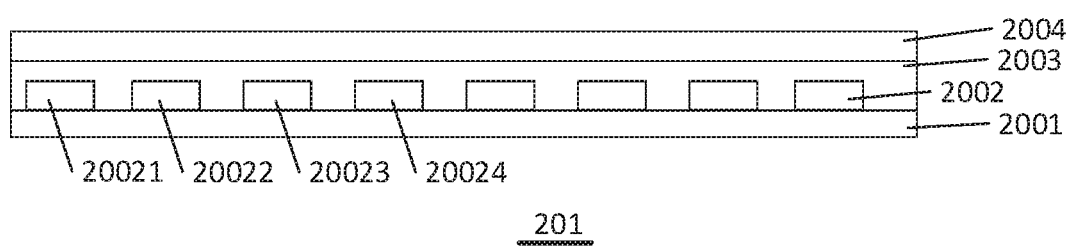
FIG. 9 is a schematic diagram of a first substrate of a liquid crystal panel in another embodiment of the present disclosure.

In the embodiment, the first substrate 201 can be a color filter substrate with a color filter. As illustrated in FIG. 9, the first substrate 201 comprises a plurality of pixel units and each pixel unit comprises a plurality of sub-pixel units. For example, a color filter layer 2002 is first formed on a base substrate 2001 of the first substrate 201, and color filters are formed at positions corresponding to the sub-pixel units in the color filter layer 2002, respectively. The base substrate 2001 can be a glass substrate, a plastic substrate or the like. For example, each pixel unit in the embodiment can comprise four sub-pixel units 20021, 20022, 20023 and 20024. In the color filter layer 2002, color filters of red, green and blue are respectively formed in three sub-pixel units of the pixel unit to form a red sub-pixel unit 20021 emitting red light, a green sub-pixel unit 20022 emitting green light, a blue sub-pixel unit 20023 emitting blue light, and another sub-pixel unit is not provided with a color filter, therefore forming a white sub-pixel unit 20024 that emits white light. For example, there are a plurality of sub-pixel units of each type (two sub-pixel units of each type are illustrated in the figure). Therefore, different sub-pixel units can emit light of different colors through the above color filters, and the white light emitted by the sub-pixel that is not provided with the color filter can increase the display brightness of the liquid crystal substrate. For example, an overcoat 2003 is formed on the color filter layer 2002 to protect the color filter layer 2002 and planarize the surface of the substrate. For example, an alignment film 2004 is formed on the overcoat 2003 to allow liquid crystal molecules in contact with the alignment film 2004 to be arranged orderly in a predetermined direction. In the embodiment, the alignment film 2004 can be formed by a liquid crystal alignment non-rubbing technology, such as an ion beam alignment technique. An ion beam is used to bombard an alignment film material at a certain angle, and structure anisotropy is generated on the surface of the material by a way of selectively breaking bonds, and therefore an alignment effect on the liquid crystal molecules is achieved. For another example, a photo-alignment technique can also be employed to generate optical anisotropy on a polymer alignment film comprising a photosensitizer by irradiation with linearly polarized ultraviolet light, so that the polymer can have an alignment ability. There are many methods to form the alignment film 2004, and the embodiments of the present disclosure are not limited in this aspect.

In the embodiment, the second substrate 202 can be an array substrate with a thin film transistor (TFT) as a switching element, and the TFT can be in a conventional form for controlling a switch-on state and a switch-off state of a drive signal. The specific structure of the thin film transistor is not limited here. For example, an alignment film or the like can be formed on an inner surface of the second substrate 202, and a polarizer or the like can be attached to an outer surface of the second substrate 202.

S202: Assembling the First Substrate 201 and the Second Substrate 202.

For example, a sealant is coated along an edge of a surface of the first substrate 201 or the second substrate 202, and the first substrate 201 and the second substrate 202 are assembled. In the embodiment, a material for forming the liquid crystal layer 103 can also be added by a drip method, or the material for forming the liquid crystal layer 103 can be injected between the first substrate 201 and the second substrate 202 by a method of vacuum injection after the first substrate 201 and the second substrate 202 are assembled together to form a cell.

S203: Performing an Exposing Process to Form a Liquid Crystal Cell and a Columnar Spacer.

In the embodiment, the exposing process, for example, is performed by irradiation of ultraviolet light, and in the embodiment, curing of the sealant and the formation of the columnar spacer can be performed, for example, in a same exposing process, that is, the liquid crystal cell and the columnar spacer are formed at same time in same one process of ultraviolet light irradiation. In the previous step, because the edge of the surface of the first substrate 201 or the second substrate 202 has been coated with the sealant and the assembling is completed, in this step, after a mask is placed in an appropriate position, the liquid crystal cell and the columnar spacer can be formed at the same time by one ultraviolet light irradiation. In the example, the sealant is an ultraviolet curable sealant.

Figure 10:
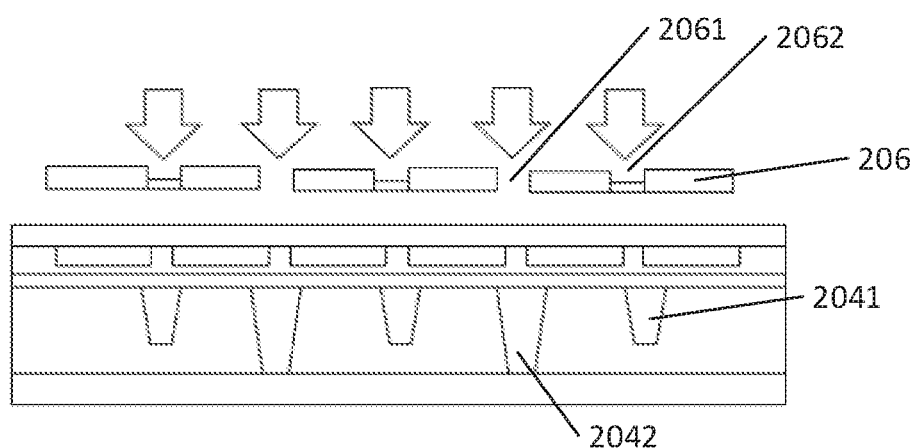
FIG. 10 is a flow diagram of a manufacture method of a liquid crystal panel in another embodiment of the present disclosure.

As illustrated in FIG. 10, in the embodiment, an exposing process is performed on the liquid crystal layer 203 in the liquid crystal cell by a mask 206, and light irradiates into a partial height or an entire height of an inner portion of the liquid crystal cell at a position of exposing, so that the photopolymerizable monomers in the liquid crystal layer 103 can be polymerized at the position of exposing, that is the position corresponding to an opening of the mask 206, to form a columnar spacer. In the embodiment, for example, the position of the opening of the mask 206 is at a position of an interval between adjacent sub-pixel units 20021, 20022, 20023 and 20024, and therefore the columnar spacer is formed corresponding to the interval between the adjacent sub-pixel units 20021, 20022, 20023 and 20024. For example, an orthographic projection of the formed columnar spacer on the first substrate 201 and an orthogonal projection of the interval between the adjacent sub-pixel units 20021, 20022, 20023 and 20024 on the first substrate 201 are overlapped.

In an example of the embodiment, sizes of the columnar spacers 104 are different, so the mask 206 used in the embodiment allows different exposure degrees at different positions to form columnar spacers with different heights. For example, a plurality of masks are respectively used to form the main spacer and the auxiliary spacer; or a mask with different openings is used, and the size of each opening is different or light transmittance of each opening is different so as to respectively form the main spacer and the auxiliary spacer.

For another example, in the embodiment, there are two kinds of columnar spacers with different sizes in the liquid crystal panel, that is a main spacer 2042 and an auxiliary spacer 2041, so two masks can be used to form the main spacer 2042 and the auxiliary spacer 2041 with different heights; alternatively, a multi-step exposing process is performed using a same mask to respectively form the main spacer 2042 and the auxiliary spacer 2041 by different light intensities. The main spacer 2042 is formed in the liquid crystal layer 203 where light with higher intensity passes through the opening of the mask, and the auxiliary spacer 2041 is formed in the liquid crystal layer 203 where light with lower intensity passes through the opening of the mask. Alternatively, as illustrated in FIG. 10, a mask 206 comprising a first opening 2061 and a second opening 2062 is used, the first opening 2061 is larger than the second opening 2062, so that the first opening 2061 is used to form the main spacer 2042 and the second opening 2062 is used to form the auxiliary spacer 2041; or in the mask 206 comprising the first opening 2061 and the second opening 2062, the light transmittance of the first opening 2061 is greater than that of the second opening 2062, so that the first opening 2061 is used to form the main spacer 2042 and the second opening 2062 is used to form the auxiliary spacer 2041. In other examples of the present embodiment, the sizes of the columnar spacers can also be more than two kinds, and the forming method can also be same as the above method, which will not be repeated here.

In the embodiment, the photopolymerizable monomers can comprise, for example, the following material:

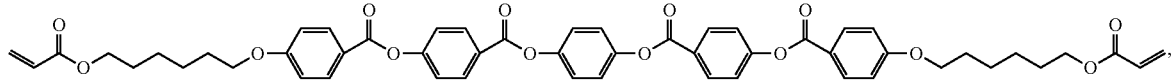

at the same time, the ultraviolet photoinitiator and the ultraviolet absorber are used. For example, a composition comprising the photopolymerizable monomers, the ultraviolet photoinitiator and the ultraviolet absorber can be added to the liquid crystal layer 203 at one time while the liquid crystal material is injected into the liquid crystal layer 203. In the composition, for example, the weight ratios of photopolymerizable monomers, the ultraviolet photoinitiator and the ultraviolet absorber can be about (94%-99.85%):(0.05%-1%):(0.1%-5%). For example, in this embodiment, a composition comprising the photopolymerizable monomers, the ultraviolet photoinitiator and the ultraviolet absorber with the weight ratios of about 97%:0.5%:2.5% can be added to the liquid crystal layer 203 at one time, so that the subsequent exposing process can be performed more efficiently.

Figure 11:
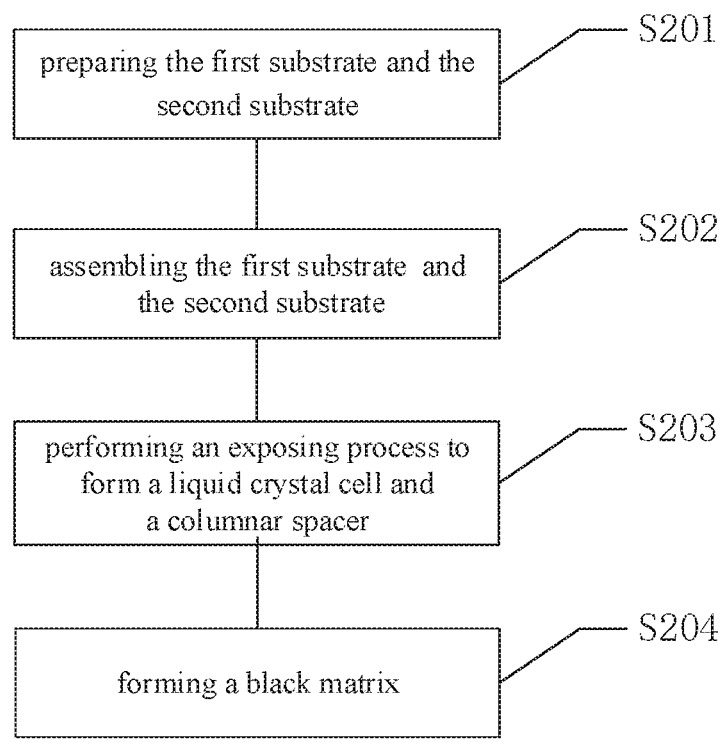
FIG. 11 is a schematic diagram of a columnar spacer formed by exposing through a mask in another embodiment of the present disclosure.

In another example of the present embodiment, as illustrated in the flow diagram of FIG. 11, the manufacture method of a liquid crystal panel further comprises:

S204: Forming a Black Matrix.

Figure 12:
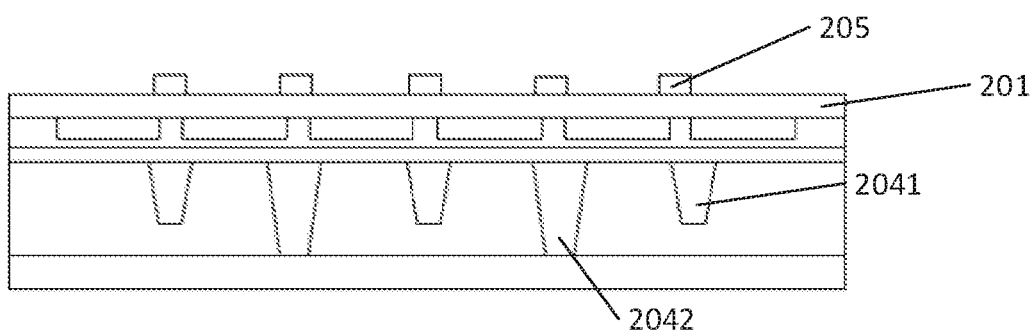
FIG. 12 is a schematic diagram of a liquid crystal panel in another embodiment of the present disclosure.

For example, after exposing to form the main spacer 2042 and the auxiliary spacer 2041, the black matrix 205 is formed at positions, on a surface of the first substrate 201 that is away from the second substrate 202, corresponding to the positions of the main spacer 2042 and the auxiliary spacer 2041. Therefore the black matrix 205 is also formed at the position corresponding to the interval of the adjacent sub-pixel units 20021, 20022, 20023 and 20024. For example, an orthogonal projection of the black matrix 205 on the first substrate 201 and an orthogonal projection of the interval of adjacent sub-pixel units 20021, 20022, 20023 and 20024 on the first substrate 201 are overlapped, as illustrated in FIG. 12. In the embodiment, the black matrix 205 can be formed of a material such as acrylic resin doped with black pigment carbon, and the specific form of the black matrix 105 is not limited here.

For example, after a black matrix is formed on the outer surface of the first substrate 201, an overcoat or a planarization layer (not illustrated) can be further formed on the outer surface, and then other components such as a polarizer (not illustrated) can be attached.

An embodiment further provides a liquid crystal display device comprising any one of the above liquid crystal panels. In the liquid crystal display device, the above liquid crystal panel can be an in-plane switch (IPS) panel, an advanced-super dimensional switching (ADS) panel or the like, and the specific form of the liquid crystal panel can be arbitrary and is not limited here. The liquid crystal display device further comprises accessory circuit elements such as a gate driver, a source driver and so on, which will not be described here. In the liquid crystal display device, the columnar spacer of the liquid crystal panel supporting the liquid crystal cell can be formed by polymerizing photopolymerizable monomers in the liquid crystal layer by exposing after the liquid crystal cell is formed, and therefore defects such as rubbing mura (a defect of thin stripes formed on the panel due to the alignment rubbing process of the alignment film) due to the height difference between the columnar spacer and its surroundings in the conventional manufacture process are avoided, and the display quality of the liquid crystal display device is improved.

The liquid crystal panel and the manufacture method thereof, the liquid crystal display device provided by at least one embodiment of the present disclosure have at least one of the following beneficial effects:

(1) In the manufacture method of a liquid crystal panel provided by at least one embodiment of the present disclosure, the columnar spacer is directly formed by polymerizing the photopolymerisable monomers in the liquid crystal layer through light irradiation to support the thickness of the liquid crystal cell.

(2) Compared with the conventional manufacture process of a liquid crystal panel, the manufacture method of a liquid crystal panel provided by at least one embodiment of the present disclosure eliminates the multi-step process such as exposing, developing, and molding used for forming the columnar spacer in the conventional manufacture process of a liquid crystal panel, and therefore the manufacture process is simplified and the production efficiency is increased.

(3) In the manufacture method of a liquid crystal panel provided by at least one embodiment of the present disclosure, the columnar spacer is formed by light irradiation after the liquid crystal substrates are assembled, and therefore defects such as rubbing mura due to the height difference between the columnar spacer and its surroundings in the conventional manufacture process are avoided, and therefore the display quality is improved.

(4) The columnar spacer in a liquid crystal panel provided by at least one embodiment of the present disclosure is formed by polymerizing the photopolymerizable monomers. The raw material photopolymerizable monomers have wide sources and low costs, and therefore the production costs can be reduced.

The following several statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness of a layer or a area may be enlarged or reduced, that is, the drawings are not drawn according to actual scale.

(3) In case of no conflict, features in one embodiment or in different embodiments can be combined to obtain a new embodiment.

The above descriptions are merely specific embodiments of the present disclosure, and the protection scope of the present disclosure is not limited thereto. Those skilled in the art can easily conceive changes or replacements within the technical scope of the present disclosure, and the changes or replacements are all within the protection scope of the present disclosure. Therefore, the protection scope of the present disclosure shall be subject to the protection scope of the claims.

The present application claims priority to the Chinese patent application No. 201710397869.8, filed on May 31, 2017, the entire disclosure of which is incorporated herein by reference as part of the present application.

What is claimed is:

1. A manufacture method of a liquid crystal panel, comprising:
   providing a first substrate, a second substrate and a liquid crystal layer between the first substrate and the second substrate, wherein the liquid crystal layer comprises a liquid crystal material and photopolymerizable monomers; and
   setting a radiation source to expose the liquid crystal layer to allow the photopolymerizable monomers to be polymerized at a position of exposing to form a columnar spacer;
   wherein the manufacture method further comprises:
   coating a sealant along an edge of the first substrate or the second substrate;
   assembling the first substrate and the second substrate to form a liquid crystal cell, and injecting the liquid crystal layer in the liquid crystal cell; and
   curing the sealant;
   wherein curing the sealant and forming the columnar spacer are performed in a same exposing process;
   the first substrate is a color filter substrate with a color filter, the second substrate is an array substrate with a thin film transistor;
   the manufacture method further comprises:
   forming a black matrix at a position, on a surface of the first substrate that is away from the second substrate, corresponding to the position of the columnar spacer after the exposing to form the columnar spacer;
   wherein the first substrate comprises a plurality of sub-pixel units, and an orthogonal projection of the position at which the column spacer to be formed on the first substrate and an orthogonal projection of an interval between adjacent sub-pixel units on the first substrate are overlapped.

2. The manufacture method of a liquid crystal panel according to claim 1, wherein exposing of the liquid crystal layer to form the columnar spacer is performed after the first substrate and the second substrate are assembled.

3. The manufacture method of a liquid crystal panel according to claim 1, wherein the exposing is performed by using a mask to irradiate light to the liquid crystal layer, and the columnar spacer is formed at the position corresponding to an opening of the mask.

4. The manufacture method of a liquid crystal panel according to claim 3, wherein exposing of different exposure energies is conducted at different positions of the mask so as to form a main spacer and an auxiliary spacer with different heights.

5. The manufacture method of a liquid crystal panel according to claim 3, wherein a plurality of masks are used for forming the main spacer and auxiliary spacer, respectively; or
a mask comprising at least a first opening and a second opening is used, wherein the first opening is larger than the second opening, or light transmittance of the first opening and light transmittance of the second opening are different, so as to form the main spacer and the auxiliary spacer, respectively.

6. The manufacture method of a liquid crystal panel according to claim 1, wherein the photopolymerizable monomers comprise one or more selected from a group consisting of:

7. The manufacture method of a liquid crystal panel according to claim 1, wherein irradiation is performed by ultraviolet light to achieve the exposing.

8. The manufacture method of a liquid crystal panel according to claim 7, wherein the liquid crystal layer further comprises an ultraviolet photoinitiator.

9. The manufacture method of a liquid crystal panel according to claim 8, wherein the ultraviolet photoinitiator comprises

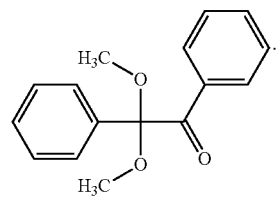 [SMILES: COC(OC)(C(=O)c1ccccc1)c1ccccc1]

10. The manufacture method of a liquid crystal panel according to claim 7, wherein the liquid crystal layer further comprises an ultraviolet absorber.

11. The manufacture method of a liquid crystal panel according to claim 10, wherein the ultraviolet absorber comprises

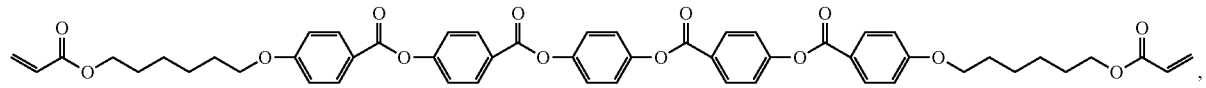 [SMILES: C=CC(=O)OCCCCCCOc1ccc(C(=O)Oc2ccc(C(=O)Oc3ccc(OC(=O)c4ccc(OC(=O)c5ccc(OCCCCCCOC(=O)C=C)cc5)cc4)cc3)cc2)cc1]

,

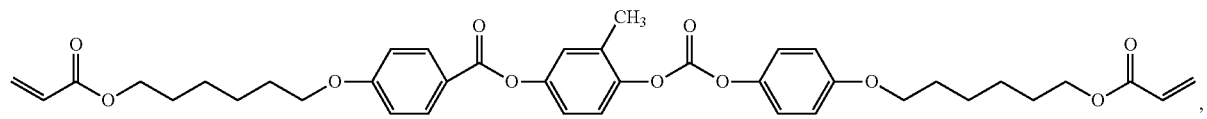

,

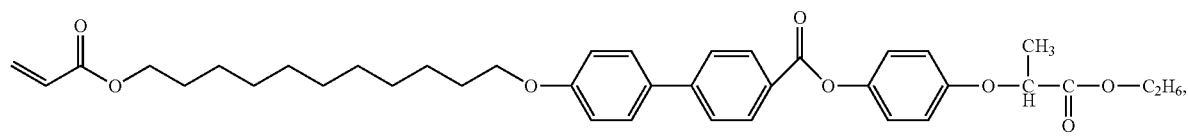

,

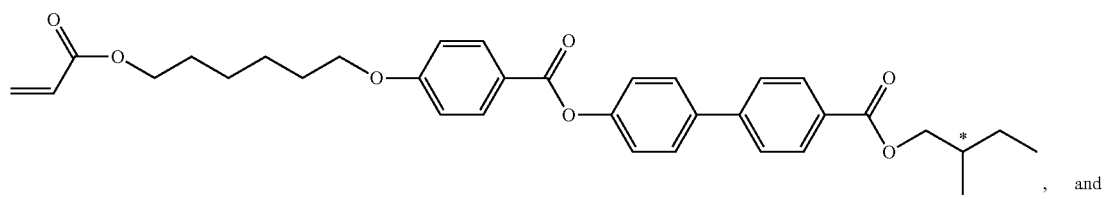

, and

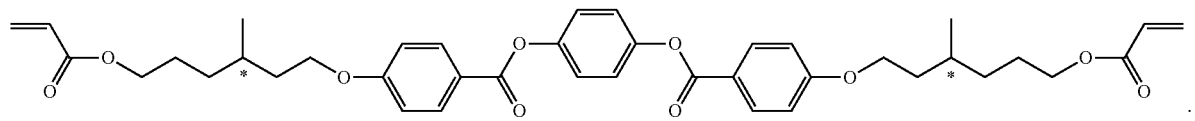

.

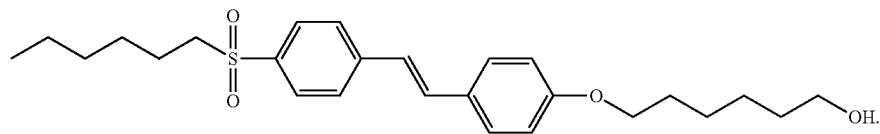 [SMILES: CCCCCCS(=O)(=O)c1ccc(/C=C/c2ccc(OCCCCCCO)cc2)cc1]

12. The manufacture method of a liquid crystal panel according to claim 1, further comprising:
   forming an alignment layer on the first substrate and/or the second substrate before assembling to form the liquid crystal cell.

13. A liquid crystal panel, manufactured by the manufacture method according to claim 1, comprising:
   a first substrate and a second substrate that are assembled with each other; and
   a liquid crystal layer between the first substrate and the second substrate,
   wherein a columnar spacer formed of a polymer formed by polymerizing photopolymerizable monomers is in the liquid crystal layer.

14. The liquid crystal panel according to claim 13, wherein the columnar spacer comprises a main spacer and an auxiliary spacer with different heights.

15. The liquid crystal panel according to claim 13, wherein a black matrix is on a surface of the first substrate that is away from the second substrate, and the column spacer is at a position corresponding to the black matrix.

16. A liquid crystal display device, comprising the liquid crystal panel according to claim 13.

* * * * *